(12) United States Patent
Foster

(10) Patent No.: US 8,505,380 B2
(45) Date of Patent: Aug. 13, 2013

(54) OUT-OF PLANE COMB-DRIVE ACCELEROMETER

(75) Inventor: Michael Foster, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 426 days.

(21) Appl. No.: 12/709,184

(22) Filed: Feb. 19, 2010

(65) Prior Publication Data

US 2011/0203372 A1 Aug. 25, 2011

(51) Int. Cl.
*G01P 15/125* (2006.01)
*G01P 15/00* (2006.01)

(52) U.S. Cl.
USPC ............... 73/514.32; 73/514.18; 73/514.24

(58) Field of Classification Search
USPC .. 73/514.01, 514.16–514.18, 514.22–514.24, 73/514.32
See application file for complete search history.

(56) References Cited

U.S. PATENT DOCUMENTS

| | | | |
|---|---|---|---|
| 6,000,280 A | | 12/1999 | Miller et al. |
| 6,170,332 B1 * | | 1/2001 | MacDonald et al. ...... 73/514.38 |
| 7,258,010 B2 * | | 8/2007 | Horning et al. ............ 73/514.32 |
| 7,469,588 B2 * | | 12/2008 | LaFond et al. ............. 73/514.32 |
| 2009/0025477 A1 * | | 1/2009 | Pilchowski et al. ........ 73/514.15 |

FOREIGN PATENT DOCUMENTS

| | | |
|---|---|---|
| EP | 2151691 A2 | 2/2010 |
| EP | 2267461 A1 | 12/2010 |

* cited by examiner

*Primary Examiner* — Hezron E Williams
*Assistant Examiner* — Nathaniel Kolb
(74) *Attorney, Agent, or Firm* — Lowe Graham Jones PLLC

(57) ABSTRACT

An out-of-plane comb-drive accelerometer. An example accelerometer linearizes a response. An example accelerometer includes one or more stators having a plurality of tines having a surface parallel to a surface of substrate. The tine surface is at a first distance from the surface of the substrate. A proof mass includes one or more rotors that include a plurality of rotor tines attached to an edge of the proof mass. The rotor tines are interleaved with corresponding ones of the stator tines. The rotor tines include a surface parallel to a surface of the substrate. The rotor tine surface is at a second distance from the surface of the substrate. The first distance and second distance are unequal by a threshold amount. Motion of the rotor relative to the stator in an out-of-plane direction provides a linear change in a capacitive value measured across the rotor and the stator.

9 Claims, 3 Drawing Sheets

OUT-OF PLANE COMB-DRIVE ACCELEROMETER

GOVERNMENT INTEREST

The invention described herein was made in the performance of work under U.S. Government Contract No. W31P4Q-07-D-0025-002 awarded by the United States Army. The Government may have rights to portions of this invention.

BACKGROUND OF THE INVENTION

Out-of-plane micro-electromechanical systems (MEMS) accelerometers typically use parallel plate capacitance pickoff sensing (sense) for open-loop devices and parallel plate capacitance rebalance (torque) for closed-loop devices. Both types of sensors are composed of two parallel plates separated by a narrow gap and having a voltage applied across them. In either case, the functionality of the device derives from the variation in capacitance that occurs when the distance across the gap changes under acceleration.

Because capacitance varies inversely as a function of the square of the gap ($C=\epsilon A/x^2$, where C=capacitance and x=the length of the gap), the response of a parallel plate-type accelerometer is inherently nonlinear. Due to the nonlinear dependence, variation in the gap distance from environmental influences, such as thermal deformation or vibration, are difficult to remove by calibration.

SUMMARY OF THE INVENTION

The present invention includes an accelerometer for linearizing a response. An example accelerometer includes a substrate with one or more stators fixedly attached to the substrate. The stators include a plurality of tines having a surface parallel to a surface of the substrate. The tine surface is at a first distance from the surface of the substrate. A proof mass is rotatably attached to the substrate. The proof mass includes one or more rotors that include a plurality of rotor tines attached to an edge of the proof mass. The rotor tines are interleaved with corresponding ones of the stator tines. The rotor tines include a surface parallel to a surface of the substrate. The rotor tine surface is at a second distance from the surface of the substrate. The first distance and second distance are unequal by a threshold amount.

With this device, motion of the rotor relative to the stator in an out-of-plane direction provides a linear change in a capacitive value measured across the rotor and the stator, thus minimizing the effect of external environmental influences.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
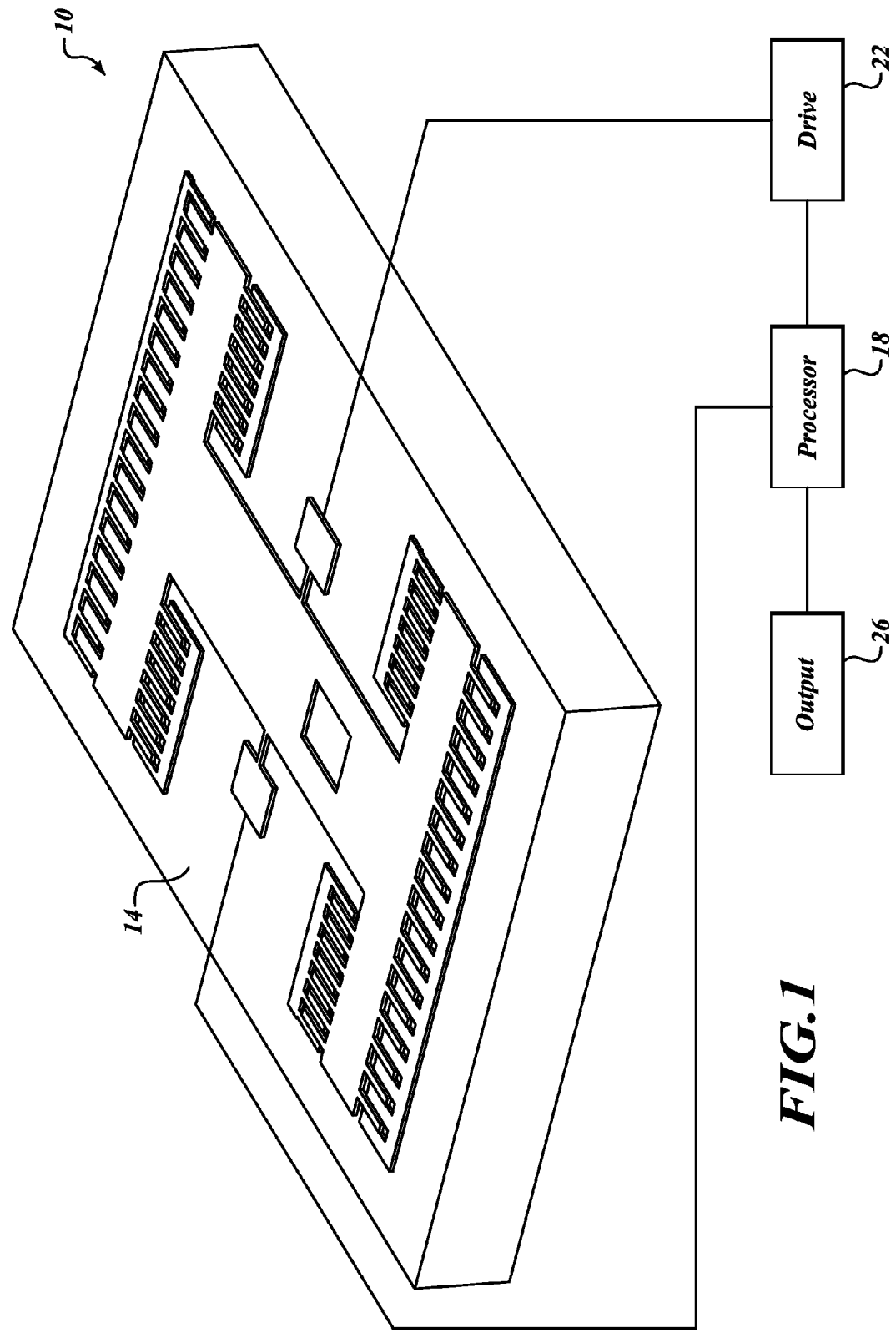
FIG. 1 illustrates a perspective view of an example system formed in accordance with an embodiment of the present invention.

FIG. 1 illustrates an example out-of-plane comb-drive accelerometer 10. The out-of-plane comb-drive accelerometer 10 includes a micro-electromechanical system (MEMS) comb-tooth structure 14, a processor 18, a drive circuit 22, and an output device 26. In one embodiment, the comb-tooth structure 14, the processor 18, and the drive circuit 22 are communicatively coupled in a loop. The processor 18 is in signal communication with the output device 26.

With the comb-tooth structure 14, the processor 18, and the drive circuit 22 connected in a loop, the out-of-plane comb-drive accelerometer 10 operates in closed-loop fashion. When the comb-drive accelerometer 10 experiences acceleration or rotation in a direction perpendicular to the plane of the comb-tooth structure 14, variation in a sense capacitance within the comb-tooth structure 14 is sensed as a change in voltage by the processor 18. The processor 18 responds to the voltage change by varying a feedback signal it outputs to the drive circuit 22. The feedback signal is continuously adjusted by the processor 18 to continuously drive drive components of the comb-tooth structure 14 toward an equilibrium (null) position. The voltage level required to compensate for the variation in capacitance is proportional to the acceleration experienced by the comb-drive structure 14. The processor 18 outputs a signal to the output device 26 that corresponds to the signal sent to the drive components. The output device 26 receives the signal from the processor 18 and outputs displays as the measured acceleration or rotation rate.

Figure 2:
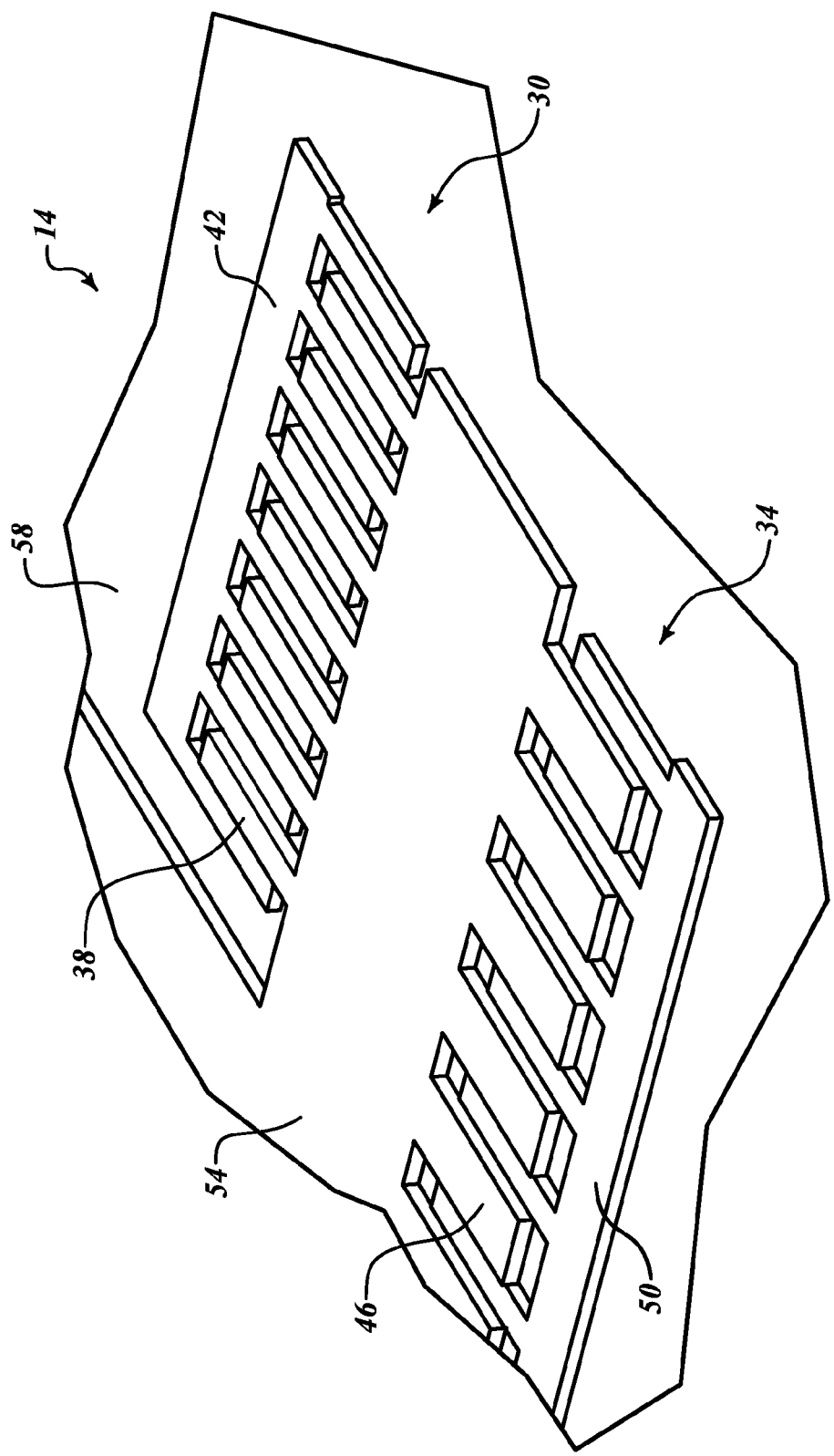
FIG. 2 illustrates a perspective view of a portion of an example system formed in accordance with an embodiment of the present invention.

FIG. 2 illustrates a portion of the MEMS comb-tooth structure 14 used in the accelerometer 10. The comb-tooth structure 14 includes one or more sense combs 30 and one or more drive combs 34. The sense comb 30 includes a sense comb rotor 38 and a sense comb stator 42. The drive comb 34 includes a drive comb rotor 46 and a drive comb stator 50. The rotors 38, 46 are electrically isolated tines located on a proof mass 54. The stators 42, 50 are attached to a base substrate 58 of the comb-tooth structure 14. The stators 42, 50 are electrically isolated from each other.

The rotors 38, 46 and the stators 42, 50 are substantially planar structures, each having a row of tines. The rotors 38, 46 and the stators 42, 50 are arranged so that they occupy substantially the same plane, but with at least a minimal offset in the out-of-plane direction (e.g., perpendicular to the surface). The tines of the rotors 38, 46 are interleaved with the tines of the stators 42, 50. Between the tines is a gap across which a capacitance is measured.

The proof mass 54 is suspended above the base substrate 58 on flexural supports located remotely from the combs 30, 34 in a see-saw manner. The flexural supports allow the proof mass 54 and, therefore, the tines of the rotors 38, 46, to move vertically (out of plane) with respect to the tines of the stators 42, 50. Motion in this direction does not change the gap between the rotors 38, 46 and the stators 42, 50, but directly leads to variation in the area of overlap between the tines of the rotors 38, 46 and the stators 42, 50. The area of overlap is specifically the portions of the sidewalls of the rotor and stator tines that face one another across the gap. As the area of overlap varies with rotor tine motion, the capacitance varies. Because the area of overlap varies linearly with movement of the rotor tines past the stator tines, the variation in capacitance is also linear. The effect provides the comb-tooth structure 14 with decreased sensitivity to the influence of environmental noise, such as thermal variation and vibration.

The processor 18 is coupled to one of the stator and rotor of the sense combs 30. The drive circuit 22 is coupled to one of the stator and rotor of the drive combs 34.

Figure 3:
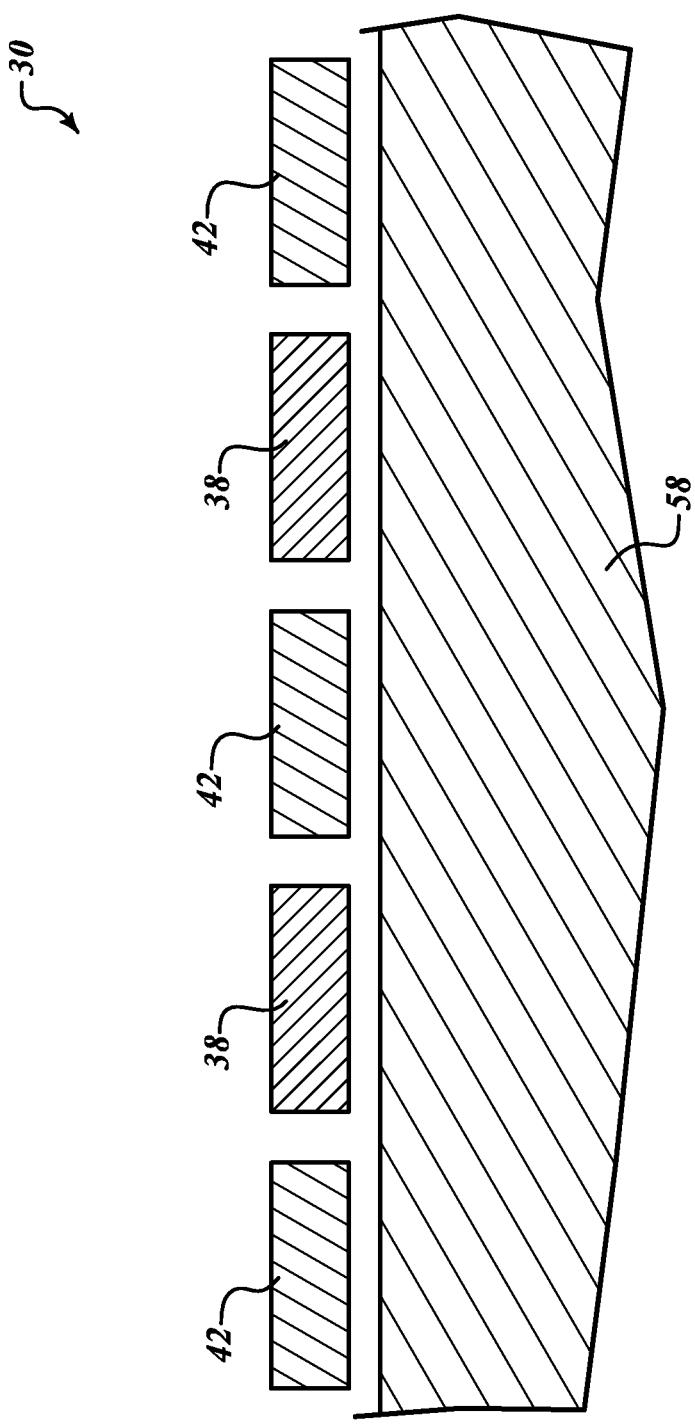
FIG. 3 illustrates a cross-sectional view of an example system formed in accordance with an embodiment of the present invention.

FIG. 3 illustrates an example offset between the tines of one of the rotors 38 and tines of one of the stators 42 for the sense comb 30. The offset is in the same direction as the to-be-sensed acceleration. The tines are offset during an etching/masking process.

The sensitivity of the comb tooth structure 14 is determined by the gap between the combs. The linearity is determined by the ratio of the offset to the thickness. The ratio between stator thickness and the magnitude of the offset is optimized in order to maintain a linear response, and thereby minimize the sensitivity of the device to thermal effects and vibration.

The offset must occur along both the top and bottom edges. The stator and rotor can be of different thicknesses, but this may affect the linearity of the mechanism. The ratio between thickness and offset is determined by the point at which small displacements in the mechanism will produce minimal changes in the electrical fringe fields at the top and bottom of the combs. This corresponds to having equal lengths for the top and bottom offsets and the overlapping structure in the middle of the comb thickness.

FIG. 1 also shows a section of the proof mass 54 has been removed from one side. Thus, this side will have less mass than the other side of the proof mass.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which exclusive property or privilege is claimed are defined as follows:

1. A micro-electromechanical systems (MEMS) device comprising:
   a substrate;
   one or more stators fixedly attached to the substrate, the stators comprising a plurality of tines having a surface parallel to a surface of the substrate, wherein the tine surface is at a first distance from the surface of the substrate; and
   a proof mass rotatably attached to the substrate, the proof mass comprising:
      a first end;
      a second end;
      a middle section for connecting the first and second ends and for connecting to the substrate via flexural supports;
      one or more rotors, the rotors comprising a plurality of rotor tines attached to an edge of the first and second ends of the proof mass, the rotor tines being interleaved with corresponding ones of the stator tines, the rotor tines comprising a surface parallel to a surface of the substrate, wherein the rotor tine surface is at a second distance from the surface of the substrate,
   wherein the first distance and second distance are unequal by a threshold amount,
   wherein the first end has a greater mass than the second end,
   wherein the first distance is less than the second distance if a direction of a to-be-sensed acceleration is in a direction from the substrate to the tines,
   wherein the direction of the to-be-sensed acceleration is perpendicular to a major proof mass plane;
   wherein the first distance is greater than the second distance if a direction of the to-be-sensed acceleration is in a direction from the tines to the substrate,
   wherein the one or more stators comprise drive and sense stators and the one or more set of rotors comprise drive and sense rotors corresponding to the drive and sense stators,
   wherein the sense rotors extend from first and second edges of the proof mass at the first and second ends, the first and second edges face towards the middle section and are parallel to a rotational axis defined by the flexural supports, the first and second edges are equidistant from a centerline of the proof mass, the centerline of the proof mass is perpendicular to the rotational axis,
   wherein the drive rotors extend from third edges of the proof mass at the first and second ends, the third edges face away from the middle section and are parallel to a rotational axis defined by the flexural supports.

2. The device of claim 1, wherein the stator tines comprise a second surface parallel to the first stator tine surface, the second surface being at a third distance from the surface of the substrate and the rotor tines comprise a second surface parallel to the first rotor tine surface, the second rotor tine surface being at a fourth distance from the surface of the substrate.

3. The device of claim 2, wherein the third and fourth distances are equal.

4. The device of claim 2, wherein the third and fourth distances are unequal.

5. The device of claim 1, wherein the threshold amount is at least greater than 3 microns.

6. A micro-electromechanical systems (MEMS) accelerometer device comprising:
   a MEMS device comprising:
      a substrate;
      one or more stators fixedly attached to the substrate, the stators comprising a plurality of tines having a surface parallel to a surface of the substrate, wherein the tine surface is at a first distance from the surface of the substrate; and
      a proof mass rotatably attached to the substrate, the proof mass comprising:
         a first end;
         a second end;
         a middle section for connecting the first and second ends and for connecting to the substrate via flexural supports;
         one or more rotors, the rotors comprising a plurality of rotor tines attached to an edge of the proof mass, the rotor tines being interleaved with corresponding ones of the stator tines, the rotor tines comprising a surface parallel to a surface of the substrate, wherein the rotor tine surface is at a second distance from the surface of the substrate,
      wherein the first distance and second distance are unequal by a threshold amount,
      wherein at least one of the rotor and corresponding stator is a drive comb,
      wherein at least one of the rotor and corresponding stator is a sense comb;
   a drive circuit in signal communication with one of the rotor or the stator of the drive comb;
   a processing device in signal communication with the drive circuit and one of the rotor or the stator of the sense comb; and
   an output device in signal communication with the processing device, the output device configured to present an acceleration value determined by the processing device, wherein the first end has a greater mass than the second end, wherein the first distance is less than the second distance if a direction of a to-be-sensed acceleration is in a direction from the substrate to the tines, wherein the direction of the to-be-sensed acceleration is perpendicular to a major proof mass plane;

wherein the first distance is greater than the second distance if a direction of a to-be-sensed acceleration is in a direction from the tines to the substrate, wherein the one or more stators comprise drive and sense stators and the one or more set of rotors comprise drive and sense rotors corresponding to the drive and sense stators, wherein the sense rotors extend from first and second edges of the proof mass at the first and second ends, the first and second edges face towards the middle section and are parallel to a rotational axis defined by the flexural supports, the first and second edges are equidistant from a centerline of the proof mass, the centerline of the proof mass is perpendicular to the rotational axis, wherein the drive rotors extend from third edges of the proof mass at the first and second ends, the third edges face away from the middle section and are parallel to a rotational axis defined by the flexural supports.

7. The device of claim 6, wherein the stator tines comprise a second surface parallel to the first stator tine surface, the second surface being at a third distance from the surface of the substrate and the rotor tines comprise a second surface parallel to the first rotor tine surface, the second rotor tine surface being at a fourth distance from the surface of the substrate.

8. The device of claim 7, wherein the third and fourth distances are equal.

9. The device of claim 7, wherein the third and fourth distances are unequal.

* * * * *